United States Patent Office 2,931,791
Patented Apr. 5, 1960

2,931,791

POLYMERIZATION OF HYDROCARBONS WITH CATALYST OF $BF_3$ AND $BCl_3$

John L. Ernst, Westfield, N.J., and Augustus Bailey Small, Baton Rouge, La., assignors to Esso Research and Engineering Company, a corporation of Delaware No Drawing. Application May 23, 1955
Serial No. 510,562

13 Claims. (Cl. 260—85.3)

This invention relates to a novel method of polymerizing unsaturated hydrocarbons, particularly by the use of a new method of catalyzing the polymerization.

It is well known that diolefins such as isoprene, butadiene, methyl pentadiene, etc. will copolymerize with olefins or will polymerize alone when treated with a Friedel-Crafts type catalyst at low temperatures (—20 to —150° C.). It is also known that in the case of copolymerization with an olefin the diolefin acts as a poison to the system thus requiring increasing amounts of catalyst as the diolefin content is increased with accompanying reduction of the molecular weight of the resulting copolymer. In the case of polymerization of the diolefin alone under the above conditions, polymerization is slow, requiring excessive amounts of catalyst, and resulting in a resinous polymer.

Boron trichloride will cause the polymerization of diolefins when the reaction is permitted to take place at their boiling point and above and results in a resinous polymer but when the temperature is maintained below —20° C. essentially no polymerization occurs even over extended periods of time. The latter is also known to be true of olefins such as isobutylene.

It has now been found that small amounts of boron trichloride is an effective co-catalyst for low temperature polymerization using ordinary Friedel-Crafts type catalyst such as $AlCl_3$, $AlBr_3$, $BF_3$, $TiCl_4$, etc. The addition of boron trichloride changes the nature of the polymerization reactions and permits the production of rubbery or elastomeric polymers directly from diolefins such as isoprene or butadiene, by polymerization at low temperatures (e.g. —20 to —150° C.). The addition of boron trichloride as a co-catalyst also has advantages in the Friedel-Crafts copolymerization of diolefins with monoolefins, as in the manufacture of GR-I or butyl rubber by copolymerizing copolymers of a major amount of isobutylene with a minor amount of isoprene or butadiene. In such copolymerization systems, the catalyst efficiency is considerably improved and a superior product is obtained.

The amount of boron trichloride to be used may vary somewhat according to the temperature, amount of diluent, and type of reactants, but normally should be within the range of 0.01 to 5.0%, preferably 0.1 to 0.5%, by wt. on the basis of the reactants, and should be about 1 to 50, preferably 10 to 30, moles per mole of regular Friedel-Crafts catalyst used. For instance, in making butyl rubber at about —100° C. in the presence of 2 to 3 volumes of methyl chloride diluent, by the use of 0.001 to 0.5%, preferably 0.005 to 0.05%, by wt. of aluminum chloride (based on the reactants), added as a solution of about 0.05 to 0.5 gram per ml. methyl chloride, the amount of boron trichloride to be used as co-catalyst, should be about 0.05 to 1.0% by wt. based on the reactants. In the case of polymerizing isobutylene alone, at —103° C. in methyl chloride diluent, the amount of aluminum trichloride may be about 0.001 to 0.1% by wt. and amount of boron trichloride should be about 0.01 to 0.5% by wt., based on the isobutylene reactant. In the case of the styrene-isobutylene copolymer, the proportion should be intermediate between amounts needed for isobutylene-diolefin copolymers and for polyisobutylene.

Boron fluoride may be used instead of aluminum chloride, and in about the same amounts by weight.

The details and advantages of the invention will be better understood from a consideration of the following experimental data.

A series of four test runs were made in which isobutylene was polymerized with a minor proportion of either isoprene or butadiene, in the presence of methyl chloride diluent, at —100° C., using as catalyst plain aluminum chloride in two runs (A and C), and using only about 10 to 15% as much aluminum chloride in the other two runs (B and D), but supplementing them with a substantially larger proportion of boron chloride as co-catalyst. This material is normally quite inactive as a catalyst per se for polymerizing olefins or diolefins at low temperature. The proportions of reactants, diluent and catalyst used are given in the following description and Table I.

*Table I*

Feed:
   1000 cc. monomers (650 g.)
   2000 cc. methyl chloride
Catalyst: 0.11 gm. $AlCl_3$/100 cc. solution (methyl chloride solvent)
Procedure: Feed chilled to —100° C. Desired amount of boron trichloride added as 10% solution (by vol.) in methyl chloride. Mixture agitated for few moments. Slight milkiness occurred upon addition of $BCl_3$, but no evidence of continuing reaction. The $AlCl_3$ catalyst solution was then added.

| Run No. | Percent Diolefin in Feed (Balance isobutylene) | | $BCl_3$ Solution added [a] | $AlCl_3$ Cat., cc. | Polym. Conv., Wt. Percent | Cat. Eff.[b] | Mooney Viscosity [c] |
|---|---|---|---|---|---|---|---|
| | Isoprene | Butadiene | | | | | |
| | Percent | Percent | Cc. | | | | |
| A | 3 | | None | 720 | 39 | 320 | 68 |
| B | 3 | | 10 | 105 | 52 | 2,930 | 49 |
| C | | 10 | None | 412 | 35 | 510 | 67 |
| D | | 10 | 10 | 52 | 34 | 3,860 | 58 |

[a] 10 vol. percent $BCl_3$ in methyl chloride.
[b] Gms. polymer per gm. $AlCl_3$.
[c] 8 minute value at 212° F.

The above table also shows the weight percent conversion (of monomers to polymer), the catalyst efficiency (being based on the grams polymer per gram of $AlCl_3$) and the Mooney viscosity of the resulting polymer.

The data in Table I show that the two runs, B and D, in which boron trichloride co-catalyst was used, gave a very much higher catalyst efficiency than the other two runs A and C in which no boron chloride was used. This proves that the boron chloride, normally inactive per se as a catalyst under such conditions, had a very pronounced and surprising co-catalyst effect. In the case of isoprene as the diolefin, in run B, the boron chloride co-catalyst even gave higher weight conversion than corresponding run A (52% compared to 39%). As the Mooney values in both runs B and D are slightly lower than those in A and C, it is believed that the co-catalyst has somewhat altered the nature of the polymerization reaction, either in preventing the formation of a few relatively high molecular weight molecules, or maintaining a generally lower level of molecular weight, or a narrower distribution of molecular weight spread, or perhaps a greater freedom from crosslinking, because it is known that even a very slight amount of crosslinking tends to make a relatively great increase in the Mooney viscosity.

The polymers produced in runs A, B, C and D were then compounded with carbon black (Wyex) and curing agents according to the following recipe.

CURING RECIPE—CURED AT 307° F.

| | Parts |
|---|---|
| Polymer | 100 |
| ZnO | 5 |
| Stearic acid | 3 |
| Wyex | 50 |
| Tuads | 1 |
| Altax | 0.5 |
| Sulfur | 2 |

The samples were then cured at 307° F. for 10, 20, and 40 minutes, in the form of conventional test pads and then tested for tensile strength, 300% modulus and percent elongation. The results are shown in the following Table II.

*Table II*

CURE DATA ON POLYMERS PREPARED IN BCl₃ MODIFIED BUTYL SYSTEMS

| Run No. | Cure Time, min. | Tensile Strength | Modulus at 300% Elongation | Elongation, Percent |
|---|---|---|---|---|
| A | 10 | 2,850 | 170 | 930 |
| | 20 | 2,975 | 380 | 810 |
| | 40 | 2,975 | 520 | 750 |
| B | 10 | 2,650 | 160 | 980 |
| | 20 | 2,950 | 380 | 850 |
| | 40 | 2,975 | 630 | 750 |
| C | 10 | 400 | 20 | 1,100+ |
| | 20 | 800 | 30 | 1,030 |
| | 40 | 1,275 | 50 | 1,050 |
| D | 10 | 475 | 20 | 1,100+ |
| | 20 | 1,150 | 30 | 1,100+ |
| | 40 | 1,600 | 30 | 1,100+ |

The cure data in Table II show a high rate of diolefin copolymerization in B and D as compared to A and C. Although B has a lower Mooney viscosity (see Table I) it exhibits a tighter cure—see 40 minute cure for most obvious improvement. D also has a lower Mooney viscosity than C, but exhibits a marked increase in tensile strength. Both C and D are in too loose a cure state to show significant difference in modulus at 300% elongation. The low butadiene content of the feed is responsible. However, the increase in tensile strength at the lower Mooney viscosity does show D contains more combined diolefin than C.

Two tests were made which show the advantages in using boron chloride as co-catalyst with titanium tetrachloride in polymerizing a diolefin such as isoprene. Data on these two tests are given in Table III.

*Table III*

ISOPRENE POLYMERIZATION

| Test No. | A | B |
|---|---|---|
| Feed | 100 gm. isoprene | 100 gm. isoprene + 2 cc. BCl₃ |
| Catalyst ᵃ | TiCl₄ | TiCl₄ |
| Reaction Temperature, °C | −80 | −80 |
| Conversion, Weight Percent | 6 | 29 |
| Polymer Description | Resinous | Elastomeric |

ᵃ 2 weight percent TiCl₄ in normal heptane. 20 cc. catalyst solution added in each test.

It will be seen from the above table that the use of titanium chloride alone (test A) in polymerizing isoprene produces a resinous, non-elastic type of polymer. Surprisingly, the addition of boron trichloride as co-catalyst with titanium tetrachloride (see test B) yields an elastomeric type polymer from the polymerization of isoprene.

It is not intended that this invention be limited to the specific examples and modifications which have been given merely for the sake of illustration but only by the appended claims in which it is intended to claim all novelty inherent in the invention and all modifications coming within the scope and spirit of the invention.

What is claimed is:

1. The process which comprises effecting the polymerization of unsaturated polymerizable hydrocarbon compounds selected from the group consisting of monoolefins and multiolefins by means of a Friedel-Crafts active metal halide catalyst and boron trichloride as a co-catalyst, at a temperature of about −20° C. to −150° C.

2. Process according to claim 1, applied to the polymerization of a feed comprising mono-olefins.

3. The process which comprises polymerizing multiolefins with a catalyst comprising 0.001 to 0.5% by weight of a Friedel-Crafts active metal halide and 0.001 to 1.0% by weight of boron trichloride.

4. The process which comprises copolymerizing a monoolefin and a diolefin with a catalyst comprising 0.001 to 0.5% by weight of a Friedel-Crafts active metal halide and 0.001 to 1.0% by weight of boron trichloride.

5. Process of making elastomeric synthetic high molecular hydrocarbon polymers which comprises polymerizing an unsaturated hydrocarbon selected from the group consisting of monoolefins and multiolefins in the presence of about 1 to 5 volumes of inert diluent at −20° C. to −150° C. and in the presence of a catalyst consisting essentially of an inert solvent solution of 0.001 to 0.5% by weight (based on reactants) of a Friedel-Crafts active metal halide selected from the group consisting of chlorides of aluminum, iron, tin, titanium and zirconium, aluminum bromide and boron fluoride, said polmerization feed also containing dissolved therein a small amount of about 0.01 to 1.0% by weight (based on reactants) of boron trichloride as co-catalyst.

6. Process according to claim 5 in which the reactant hydrocarbon feed comprises a major proportion of isobutylene and a minor proportion of a conjugated diolefin of 4 to 6 carbon atoms.

7. A process of making synthetic rubber which comprises copolymerizing a major proportion of isobutylene with a minor proportion of isoprene at a temperature below 0° C. in the presence of about 1 to 5 volumes of inert diluent per volume of reactants, and in the presence of a catalyst consisting essentially of about 0.005 to 0.05% by weight (based on reactants) of aluminum chloride and of about 0.05 to 1.0% by weight (based on reactants) of boron trichloride dissolved in methyl chloride.

8. The process of making butyl rubber which comprises mixing and cooling to about −100° C. about 97% by wt. of isobutylene with about 3% of isoprene and about 2 volumes of methyl chloride per volume of reactants, and adding to the resulting solution methyl chloride containing 0.1 to 0.5 wt. percent (on reactants) of boron trichloride, and also adding 0.005 to 0.05 wt. percent (on reactants) of aluminum chloride, in the form of a solution thereof in methyl chloride.

9. The process of making butyl rubber which comprises mixing and cooling to about −100° C. about 90% by weight of isobutylene with about 10% by weight of butadiene and about two volumes of methyl chloride per volume of reactants, and adding to the resulting solution methyl chloride containing 0.1 to 0.5 wt. percent (on reactants) of boron trichloride, and also adding 0.005 to 0.05 wt. percent (on reactants) of aluminum chloride, in the form of a solution thereof in methyl chloride.

10. The process of making an elastomeric synthetic homopolymer of isoprene which comprises cooling isoprene to about −80° C., and adding thereto about 0.001 to 0.5% by weight of $TiCl_4$ and about 0.01 to 1.0% by weight of $BCl_3$.

11. The process of making elastomeric hydrocarbon polymerization products, which comprises mixing and cooling to about −20° C. to −150° C. a polymerization feed selected from the group consisting of isobutylene, isoprene, butadiene, and mixtures thereof, and about one to five volumes of inert diluent, and adding to the resulting solution about 0.001 to 0.5% by weight (based on reactants) of a Friedel-Crafts active metal halide selected from the group consisting of chlorides of aluminum, iron, tin, titanium and zirconium, aluminum bromide and boron fluoride, and about 0.01 to 1.0% by weight of boron trichloride.

12. A process according to claim 11 in which the Friedel-Crafts catalyst is $AlCl_3$.

13. A process according to claim 11 in which the Friedel-Crafts catalyst is $TiCl_4$.

References Cited in the file of this patent

UNITED STATES PATENTS

| | | |
|---|---|---|
| 2,142,980 | Huijser et al. | Jan. 3, 1939 |
| 2,471,130 | Vesterdal | May 24, 1949 |
| 2,481,273 | Young | Sept. 6, 1949 |
| 2,485,454 | Nelson et al. | Oct. 18, 1949 |
| 2,486,368 | Frey | Oct. 25, 1949 |
| 2,734,892 | Carter | Feb. 14, 1956 |